United States Patent [19]
Zemen, Jr.

[11] Patent Number: 5,396,027
[45] Date of Patent: Mar. 7, 1995

[54] STRIP ELECTRICAL SYSTEM

[75] Inventor: Russell E. Zemen, Jr., Fort Wayne, Ind.

[73] Assignee: Dekko Engineering, Inc., Kendallville, Ind.

[21] Appl. No.: 975,603

[22] Filed: Nov. 12, 1992

[51] Int. Cl.$^6$ .............................................. H02G 3/18
[52] U.S. Cl. ........................................................ 174/48
[58] Field of Search ........................................ 174/48, 53

[56] References Cited

U.S. PATENT DOCUMENTS

| | | | |
|---|---|---|---|
| 895,362 | 8/1908 | Goldschmidt | 174/49 |
| 1,718,252 | 6/1929 | Putnam | 52/220.3 |
| 1,718,253 | 6/1929 | Putnam | 52/220.3 |
| 2,150,963 | 3/1939 | De Mask | 361/675 |
| 2,250,513 | 7/1941 | Von Gehr | 439/120 |
| 2,444,648 | 7/1948 | Jackson et al. | 174/72 B |
| 2,979,686 | 4/1961 | Longmire | 439/115 |
| 3,157,732 | 11/1964 | Richards | 174/53 |
| 3,439,309 | 4/1969 | Giger, Jr. et al. | 439/114 |
| 3,464,052 | 8/1969 | Hukin | 439/215 |
| 3,488,621 | 1/1970 | Stevens | 439/114 |
| 3,922,478 | 11/1975 | Perkey | 174/53 |
| 4,056,297 | 11/1977 | Gartung | 439/215 |
| 4,060,294 | 11/1977 | Haworth et al. | 174/48 X |
| 4,199,206 | 4/1980 | Haworth et al. | 439/31 |
| 4,203,639 | 5/1980 | VandenHoek et al. | 439/215 |
| 4,231,630 | 11/1980 | Propst et al. | 439/215 |
| 4,336,418 | 6/1982 | Hoag | 174/53 |
| 4,795,355 | 1/1989 | Dorn et al. | 439/215 |
| 4,800,695 | 1/1989 | Menchetti | 52/221 |
| 4,874,322 | 10/1989 | Dola et al. | 439/210 |
| 4,875,871 | 10/1989 | Booty, Sr. et al. | 439/209 |
| 4,952,163 | 8/1990 | Dola et al. | 439/211 |
| 4,973,796 | 11/1990 | Dougherty et al. | 174/48 |
| 5,092,787 | 3/1992 | Wise et al. | 439/215 |
| 5,141,447 | 8/1992 | Poirier | 439/207 |

FOREIGN PATENT DOCUMENTS 1344398  10/1963  France .

OTHER PUBLICATIONS

Article "Smart House revealed," Popular Science, Nov. 1990, pp. 51–52.

Primary Examiner—Gerald P. Tolin
Assistant Examiner—David Tone
Attorney, Agent, or Firm—Barnes & Thornburg

[57] ABSTRACT

A wiring assembly is provided for mounting on an exposed surface of a wall or wall panel to supply electrical power to the wall or wall panel. The wiring assembly includes a plurality of conductive bus bars and an insulating support having a base and a plurality of generally parallel dividers extending upwardly from the base to define a plurality of slots therebetween. Each slot is configured to receive a conductive bus bar therein. The support is coupled to said exposed surface. The assembly also includes a cover coupled to the support. The cover is situated over the plurality of dividers to shield the plurality of conductive bus bars situated in the plurality of slots. The assembly further includes an electrical outlet coupled to the conductive bus bars for providing an outlet for electrical power from the wiring assembly.

37 Claims, 5 Drawing Sheets

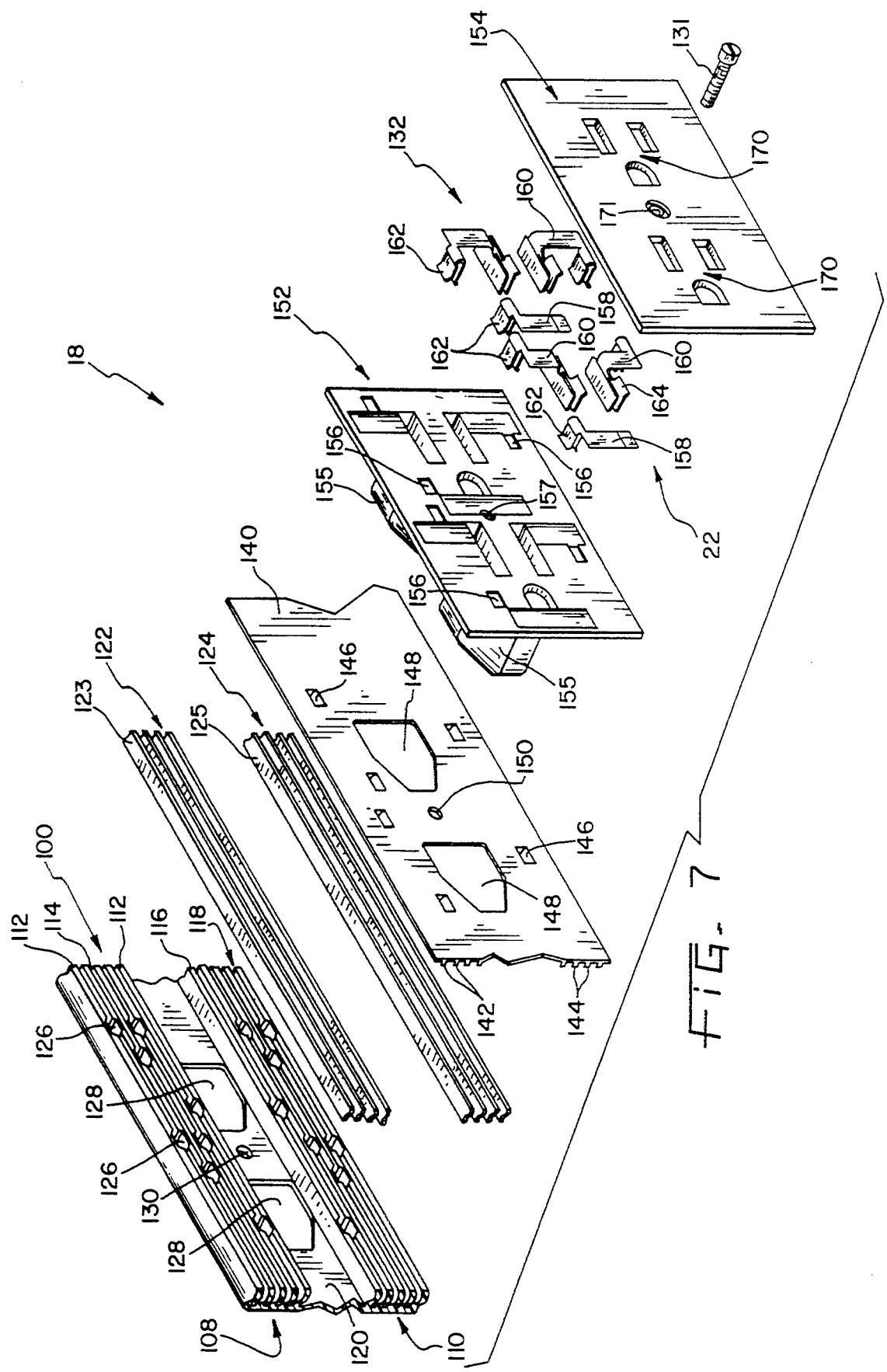

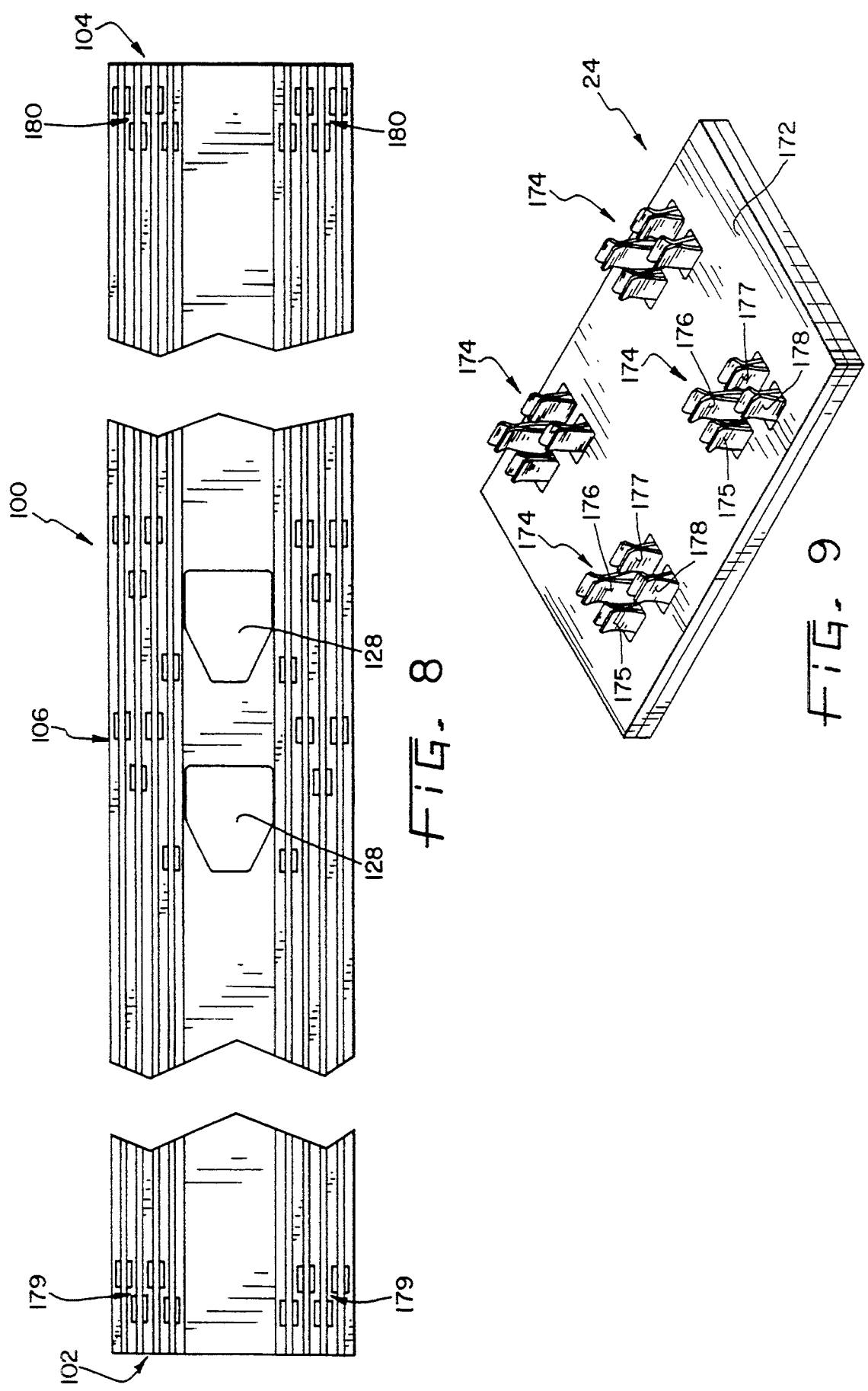

5,396,027

STRIP ELECTRICAL SYSTEM

BACKGROUND AND SUMMARY OF THE INVENTION

The present invention relates to a surface mounted continuous wiring system. More particularly, the present invention relates to a modular wiring system for mounting on the surface of a wall or wall panel to supply electrical power to the wall or wall panel.

Modern offices often use free-standing partitions or wall panels to form individual office cubicles in an open office environment. These cubicles provide a proper working environment while maintaining versatility and mobility for unrestricted office organization and expansion. It is essential that each of the cubicles formed by the wall panels is provided with electrical power. Therefore, various wiring systems which permit adjacent panels to be electrically coupled together have been developed. Wall panels often need to be assembled, disassembled, or reconfigured to provide larger or smaller work stations. Therefore, it is essential that the wiring system be flexible and easy to reconfigure. It is known to provide various types of wiring harness assemblies located inside wall panels to supply power to the wall panels.

The present invention is designed to be mounted on an external, exposed surface of the wall panels or on an exposed surface of any existing wall in the building to provide electrical power to that area of the building. The present invention is designed to minimize the amount of copper required and to provide a continuous wiring system which is easy to install with no complex wiring to install.

Because the continuous wiring system of the present invention is mounted on an external exposed surface of the wall, the continuous wiring system of the present invention can be placed at any height on the wall for easy access. Therefore, the surface mount continuous wiring system of the present invention facilitates supplying electricity to any desired area of a building. Advantageously, the surface mount continuous wiring system of the present invention simplifies installation and is easy to reconfigure if desired.

According to one aspect of the present invention, a wiring assembly is provided for mounting on an exposed surface of a wall or wall panel to supply electrical power to the wall or wall panel. The wiring assembly includes a plurality of conductive bus bars and an insulating support having a base and a plurality of generally parallel dividers extending upwardly from the base to define a plurality of slots therebetween. Each slot is configured to receive a conductive bus bar therein. The assembly also includes means for coupling the support to said exposed surface and a cover coupled to the support. The cover is situated over the plurality of dividers to shield the plurality of conductive bus bars situated in the plurality of slots. The assembly further includes outlet means coupled to the conductive bus bars for providing an outlet for electrical power from the wiring assembly.

According to another aspect of the present invention, the support includes first and second side walls located on opposite sides of the base and an elongated tab formed on each of the first and second side walls. The cover includes a face plate and first and second side members extending away from the face plate. The first and second side members of the cover each include an inwardly extending flange for engaging the tabs on the first and second side walls, respectively, to secure the cover to the support.

According to yet another aspect of the present invention, the cover includes a plurality of inwardly extending insulating strips for entering the plurality of slots formed in the support to hold the plurality of conductive bus bars in a predetermined position within the support. The cover is preferably a one-piece, electrically insulated cover.

The outlet means includes an outlet box located adjacent the cover. The outlet box is formed to include a plurality of apertures. The outlet means also includes a plurality of clip connectors configured to pass through the plurality of apertures formed in the outlet box and to engage selected conductive bus bars. The outlet means further includes means for receiving blade electrodes of a power plug to couple the power plug to the bus bars, thereby supplying electrical power from the conductive bus bars to the power plug.

In one embodiment of the present invention, the wiring assembly comprises eight conductive bus bars arranged in a substantially equal vertical spaced relation. The outlet means includes a receptacle located vertically spaced below the bus bars and the cover.

In another embodiment of the present invention, the wiring assembly comprises eight conductive bus bars located in a vertical spaced relation. Four of said bus bars being substantially equally spaced to form a first set of bus bars. The remaining four of said bus bars are substantially equally spaced to form a second set of bus bars. The first set of bus bars is vertically spaced from said second set of bus bars. In this embodiment, the outlet means is disposed between said first and second sets of bus bars.

According to still another aspect of the present invention, a modular wiring assembly is provided for mounting on an exposed surface of a wall or wall panel to supply electrical power to the wall or wall panel. The wiring assembly includes a plurality of conductive bus bars and a plurality of one piece electrically insulating supports. Each support including a base and a plurality of generally parallel insulating dividers extending upwardly from the base to define a plurality of elongated slots therebetween. Each slot is configured to receive one of the plurality of conductive bus bars therein. The wiring assembly also includes means for coupling the plurality of supports to said exposed surface to form a continuous wiring strip on the exposed surface and a plurality of covers. One cover is coupled to each of the supports to shield the plurality of conductive bus bars situated in the plurality of slots. The wiring assembly further includes a plurality of electrical outlets and means for coupling said plurality of electrical outlets to selected ones of said bus bars. The wiring assembly still further includes means for electrically coupling conductive bus bars located in adjacent supports together to provide a continuous electrical path through the plurality of supports.

The means for electrically coupling conductive bus bars located in adjacent supports together includes a jumper located between each adjacent support. Each jumper includes a plurality of conductive clips for electrically coupling conductive bus bars located in adjacent supports together.

Additional objects, features, and advantages of the invention will become apparent to those skilled in the art upon consideration of the following detailed description of preferred embodiments exemplifying the best mode of carrying out the invention as present perceived.

BRIEF DESCRIPTION OF THE DRAWINGS

FIG. 7 is an exploded perspective view of the belt level continuous wiring assembly of the present invention including a surface mount support, a plurality of conductive bus bars, a cover, and a receptacle outlet including a plurality of clips for coupling a plug to the conductive bus bars.

FIG. 8 is a side elevational view of a surface mount support for the belt level continuous wiring system illustrated in FIG. 7.

FIG. 9 is a perspective view of a jumper connector for electrically coupling two adjacent surface mount supports of the belt level continuous wiring systems.

DETAILED DESCRIPTION OF THE DRAWINGS

Figure 1:
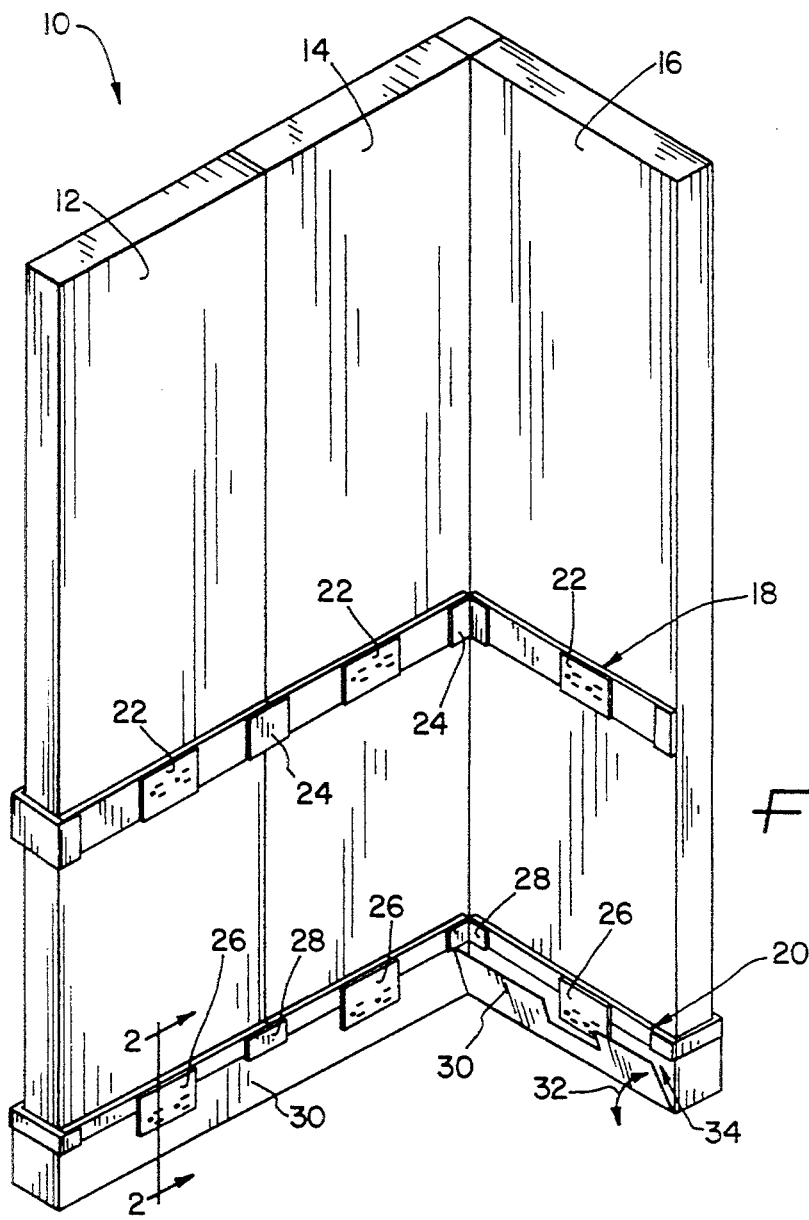
FIG. 1 is a perspective view of a wall panel system including a belt level continuous wiring assembly and a floor level continuous wiring assembly of the present invention surface mounted on the wall panels.

Referring to FIG. 1, a wall panel system 10 is illustrated for dividing a room into a plurality of work stations. Wall panel system 10 includes a plurality of wall panels 12, 14, and 16 which are coupled together. The surface mount continuous wiring system of the present invention includes a belt level continuous wiring assembly 18 and a floor level continuous wiring assembly 20. Belt level continuous wiring assembly 18 includes a plurality of receptacles 22 and a plurality of jumpers 24 for coupling adjacent components of assembly 18 together electrically. Floor level continuous wiring assembly 20 includes a plurality of receptacles 26 and a plurality of jumpers 28 for coupling adjacent components of floor level assembly 20 together electrically. Receptacles 22 are substantially centered on belt level continuous wiring assembly 18. Receptacles 26 extend below the floor level assembly 20.

Figure 2:
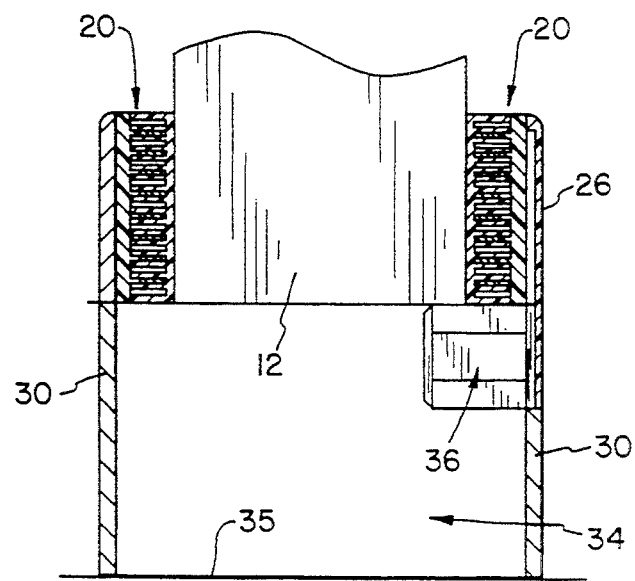
FIG. 2 is a sectional view taken along lines 2—2 of FIG. 1 illustrating the configuration of the floor level continuous wiring assembly and a communications raceway formed beneath the wall panel.

Access panels 30 are movable in the direction of arrow 32 to provide access to a communication raceway 34 below wall panels 12, 14 and 16. FIG. 2 illustrates the communications raceway 34 in detail. Communications raceway 34 is a chamber defined between the bottom of wall panel 12, 14 and 16 opposite access panels 30, and floor 35. Receptacle outlets 36 of floor level continuous wiring assembly 20 extend into communications raceway 34. Access panels 30 can be removed without exposing any of the conductive leads inside the floor level continuous wiring assembly 20. The communications raceway 34 also permits communication lines such as telephone lines and computer cables to be routed beneath wall panels 12, 14, and 16.

Both the belt level wiring assembly 18 and floor level wiring assembly 20 are mounted to an exposed surface of wall panels 12, 14 and 16. It is understood, however, that both belt level wiring assembly 18 and floor level wiring assembly 20 can be mounted on any wall or surface of a building to supply electrical power to the building.

Figure 3:
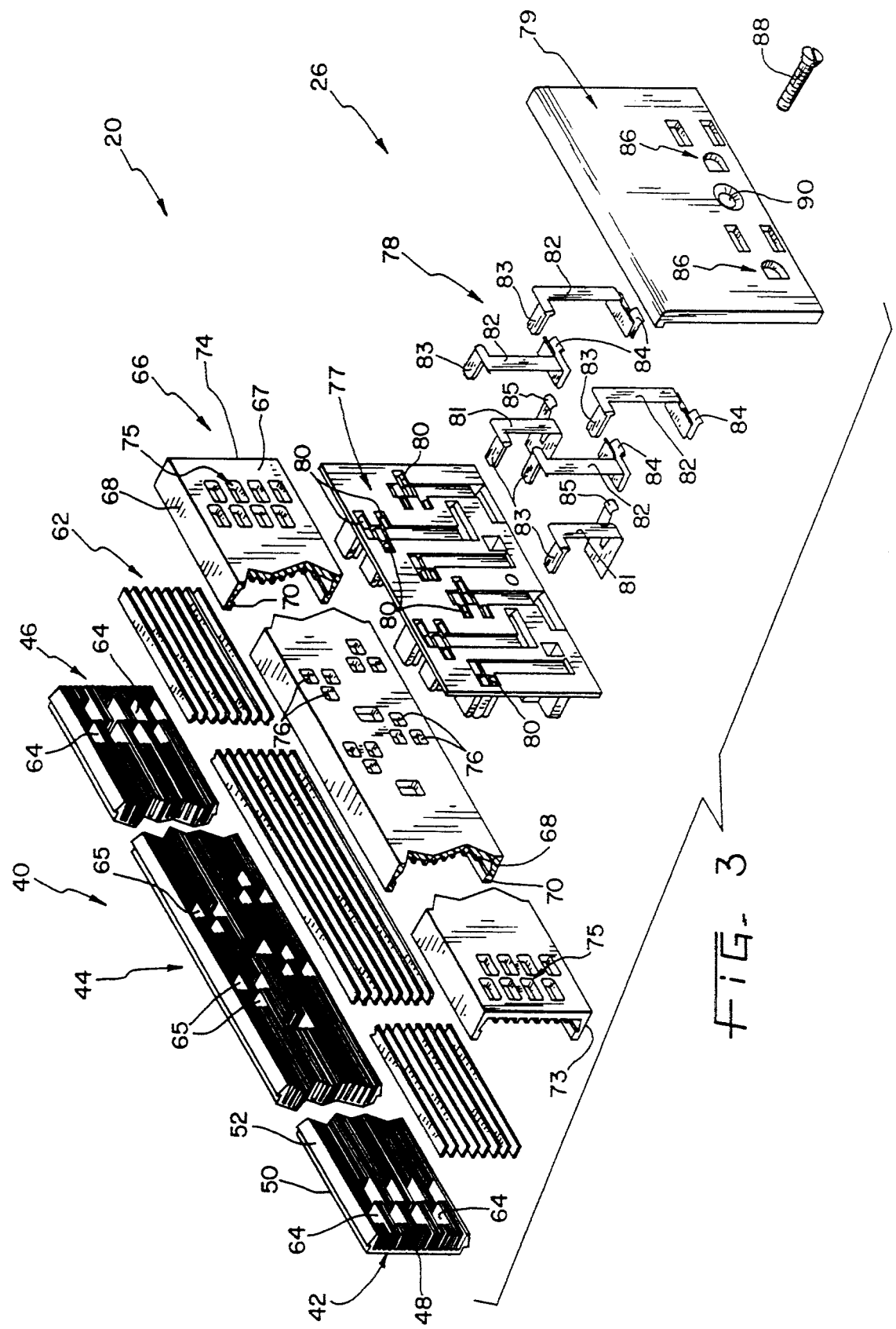
FIG. 3 is an exploded perspective view of the floor level continuous wiring assembly of the present invention including a lower surface mount support, a plurality of conductive bus bars, a strip cover, and a receptacle outlet including a plurality of clips for coupling a plug to the conductive bus bars.
Figure 5:
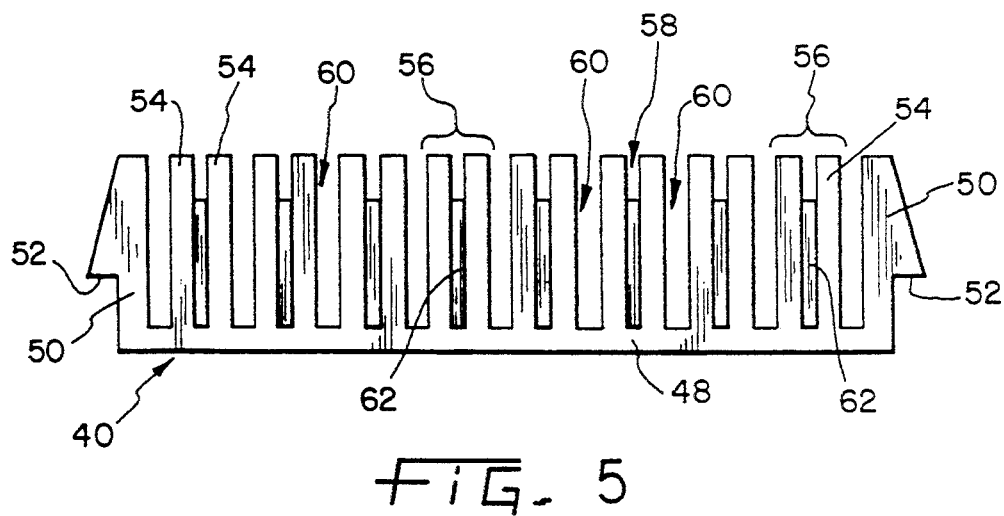
FIG. 5 is an end elevational view of the lower surface mount support illustrated in FIG. 3 after the conductive bus bar have been inserted into the plurality of conductor-receiving slots formed in the lower surface mount support.

Floor level wiring assembly 20 as best illustrated in FIG. 3 includes a plurality of extruded carriers or supports 40. Only one of the supports 40 is illustrated in detail in FIG. 3. A plurality of supports 40 are electrically coupled to provide wiring assembly 20. Surface mount support 40 is preferably an elongated extruded plastic support 40 having a first end 42, a center receptacle-receiving portion 44, and a second end 46. As best illustrated in FIG. 5, support 40 is formed to include a base 48 and upwardly extending side walls 50. Side walls 50 are each formed to include an elongated tab member 52 extending outwardly from side walls 50. Support 40 is also formed to include a plurality of upstanding dividers 54 which extend upwardly away from base 48. Dividers 54 are generally parallel to each other and to side walls 50 of support 40. Dividers 54 are arranged in divider pairs 56 which define a slot 58 therebetween. In addition, slots 60 are formed between adjacent pairs 56 of dividers 54. A conductive bus bar 62 is positioned within each slot 58 between each pair 56 of dividers 54. In the FIG. 3 embodiment, a total of eight conductive bus bars 62 are located in support 40. Bus bars 62 are arranged in a substantially equal vertical spaced relation.

Figure 6:
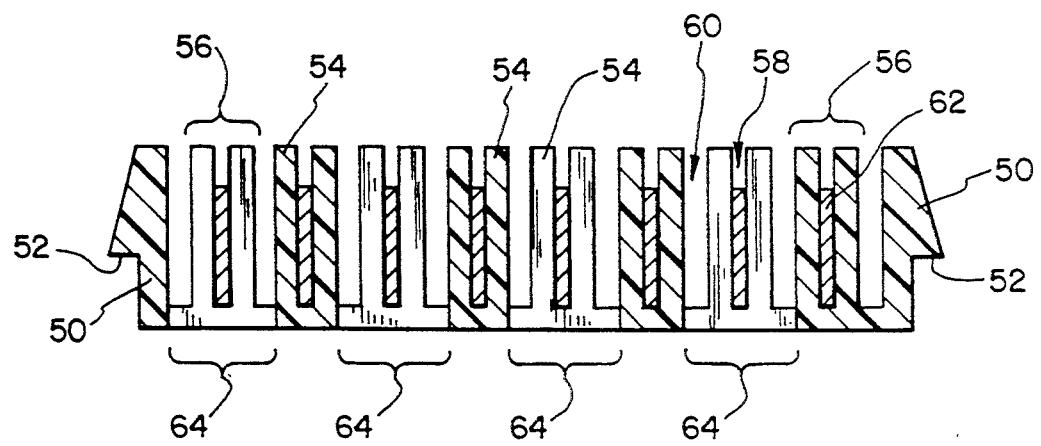
FIG. 6 is a sectional view taken through punched out apertures formed in the lower surface mount support.

As illustrated in FIG. 3, support 40 is formed to include a plurality of apertures 64 adjacent first end 42 and adjacent second end 46. In addition, a plurality of apertures 65 are punched from receptacle-receiving section 44 of support 40. Apertures 64 and 65 are punched completely through base 48 of support 40. The configuration of the punched-out apertures 64 is illustrated in FIGS. 3 and 6. Apertures 64 are staggered in two rows of apertures in order to leave a portion of the insulating dividers 54 of support 40 on opposite sides of each conductive bus bar 62.

Figure 4:
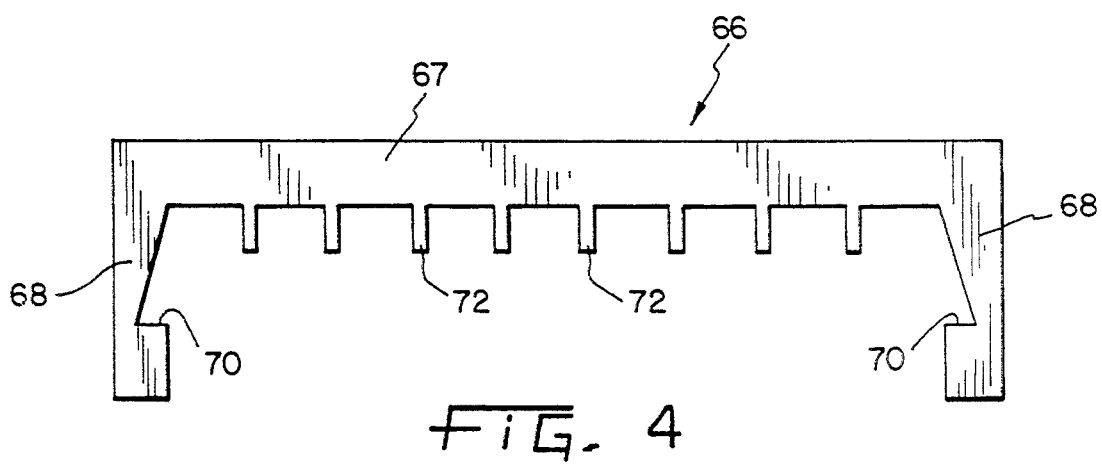
FIG. 4 is an end elevational view of the cover illustrated in FIG. 3.

Floor level wiring assembly 20 includes a plurality of covers 66 for covering the plurality of supports 40. FIG. 4 illustrates a cover 66 which is configured to be coupled to support 40. Cover 66 is formed from an extruded plastic material and includes a front plate 67 and opposite side members 68. Each side member 68 includes a flange 70 for engaging tabs 52 of support 40 to lock cover 66 to support 40. Cover 66 also includes eight inwardly-extending strips 72. Inwardly-extending strips 72 are configured to enter slots 58 between pairs 56 of dividers 54. Inwardly-extending strips 72 engage conductive bus bars 62 to hold connective bus bars 62 in the predetermined position illustrated in FIGS. 5 and 6 against base 48 of support 40.

As illustrated in FIG. 3, cover 66 includes a first end 73 and a second end 74. Cover 66 is formed to include a plurality of apertures 75 adjacent both first end 73 and second end 74. Apertures 75 have an identical pattern to apertures 64 formed in support 40. In addition, cover 66 is formed to include a plurality of apertures 76 having the same predetermined pattern as apertures 65 formed in support 40. Cover 66 shields bus bars 62 located within support 40 so that the conductive bus bars 40 are not exposed.

Receptacle 26 of floor level continuous wiring assembly 20 includes an outlet body 77, a plurality of conductive clips 78, and a cover plate 79. Outlet body 77 is formed to include apertures 80 having a pattern corresponding to apertures 76 formed in cover 66 and aperture 65 formed in support 40.

Clips 78 include ground clips 81 and clips 82 which engage blade electrodes or prongs of a common plug inserted into receptacle 26. Clips 81 and 82 include inwardly projecting connectors 83 which pass through apertures 80 formed in outlet body 77 through apertures 76 formed in cover 66, and engage selected bus bars 62 located within apertures 65 of support 40. Cover plate 79 is formed to include two sets of standard apertures 86 for receiving standard three-prong plugs. Fastener 88 extends through an aperture 90 formed in cover plate 79 to secure the floor level continuous wiring assembly 20 to a selected wall panel 12, 14 or 16. Clips 82 also include outwardly opening connectors 84 for engaging the blade electrodes or prongs of the common plug which is inserted into apertures 86 of lower plate 79. Ground clips 81 include a spring contact 85 for engaging the ground prong of the plug.

The jumpers 28 for coupling adjacent supports 40 together electrically include a plurality of conductive clips which engage bus bars 62 within aperture 64. It is understood that jumpers 28 for the floor mount support 20 are configured similar to jumper 24 illustrated in FIG. 9 and discussed in more detail below. However, the clips 174 of jumpers 28 are positioned closer together to correspond to apertures 64 in first end 42 and second end 46 of support 40.

The belt level continuous wiring assembly 18 is illustrated in detail in FIG. 7. Wiring assembly 18 includes a plurality of supports 100. Support 100 is illustrated in FIG. 8. Support 100 is made from an extruded plastic material and includes a first end portion 102, a second end portion 104, and a receptacle-receiving portion 106. Support 100 includes a first bus bar receiving portion 108 and a second bus bar receiving portion 110 spaced apart from first bus bar receiving portion 108. First portion 108 includes five upstanding dividers 112 which define four bus bar conductor-receiving slots 114 therebetween. Second portion 110 also includes five upstanding dividers 116 which define four bus bar conductor-receiving slots 118 therebetween. A center section 120 of support 100 is situated between first portion 108 and second portion 110. A first set 122 of four conductive bus bars 123 is situated in slots 114 of first portion 108. A second set 124 of four conductive bus bars 125 is situated in the conductor-receiving slots 118 of second portion 110 of support 100. Support 100 is punched to form a plurality of notches or cavities 126 therein. In addition, outlet apertures 128 are punched into center section 120 of support 100. A center aperture 130 is also punched in center section 120 of support 100 for receiving a fastener 131 therethrough to secure support 100 to a wall panel or wall. Cavities 126 permit a plurality of spring clips 132 to engage conductive bus bars 123 and 125.

Belt level continuous wiring assembly 18 includes an extruded plastic cover 140. Cover 140 includes four inwardly-extending strips 142 which enter slots 114 of first portion 108 of support 100 to hold the conductive bus bars 123 in a predetermined position in slots 114. In addition, cover 140 includes a second set of inwardly-extending strips 144 which enter slots 118 formed in second portion 110 of support 100. Strips 144 enter slots 118 and engage conductive bus bars 125 to hold bus bars 125 in a predetermined position within slots 118. Cover 140 is punched to include a plurality of clip-receiving apertures 146, two outlet receiving apertures 148, and a fastener-receiving aperture 150. Cover 140 can be coupled to support 100 by ultrasonic welding or by other suitable means so that cover 140 is permanently attached to support 100.

Receptacle 22 includes an outlet body 152, a plurality of conductive clips 132, and a cover plate 154. Outlet body 152 includes receptacle outlets 155 disposed between first set 122 and second set 124 of bus bars 123 and 125. Outlet body 152 is formed to include apertures 156 having the same pattern as apertures 146 of cover 140. Clips 132 include ground clips 158 and clips 160 which engage blade electrodes or prongs of a common plug. Clips 158 and 160 include inwardly projecting connectors 162 which pass through apertures 156 and apertures 146 and into cavities 126 to engage a respective conductive bus bar 123 or 125. Connectors 162 on ground clips 158 are coupled to ground bus bar, while connectors 162 of clips 160 engage selected bus bars 123 or 125. It is understood that the configuration of clips 132 may be changed so that the clamps engage different bus bars 123 or 125. Clips 160 also include outwardly opening connectors 164 for receiving prongs of plug connectors therein. Clips 160 provide an electrical connection between a standard plug and the conductive bus bars 123 and 125.

Cover plate 154 is formed to include two sets of standard apertures 170 for receiving standard three-prong plugs. Fastener 131 extends through an aperture 171 formed in cover plate 154, aperture 157 of outlet 152, aperture 150 in cover 140, and aperture 130 of support 100 to secure support 100 to a selected wall panel 12, 14 or 16 or to any exposed surface.

A jumper 24 for coupling adjacent supports 100 together is illustrated in FIG. 9. Jumper 24 includes a body portion 172 and a plurality of inwardly-extending clips 174. Clips 175 are electrically coupled together. Clips 176 are electrically coupled, clips 177 are electrically coupled, and clips 178 are electrically coupled. Clips 174 are inserted into cavities 179 formed in first end 102 of a first support 100 and into cavities 180 formed in a second end 104 of a second center support 100 located adjacent to the first center support. Clips 174 are coupled to bus bars 123 and 124 within cavities 179 and 180 formed in the end portions 102 and 104 of supports 100 to electrically couple adjacent supports 100 together.

From the preceding description of the preferred embodiments, it is evident that the objects of the invention are obtained. Although the invention has been described and illustrated in detail, it is to be clearly understood that the same is intended by way of illustrated and example only and is not to be taken by way of limitation. The spirit and scope of the invention are to be limited only by the terms of the appended claims.

What is claimed is:

1. A wiring assembly for mounting on an exposed surface of a wall or wall panel to supply electrical power to the wall or wall panel, the assembly comprising:

a plurality of conductive bus bars extending along the exposed surface of the wall or wall panel;

an insulating support including a base and a plurality of generally parallel dividers extending from the base to define a plurality of slots therebetween, each slot being configured to receive a conductive bus bar therein;

means for coupling the support to said exposed surface;

a cover coupled to the support, the cover being situated over the plurality of dividers to shield the plurality of conductive bus bars situated in the plurality of slots; and outlet means for coupling to at least two conductive bus bars to provide an outlet of electrical power from the wiring assembly at one of a plurality of alternative points along .the lengths of the bus bars.

2. The assembly of claim 1, wherein the support includes first and second side walls located on opposite sides of the base and an elongated tab formed on each of the first and second side walls, and the cover includes a face plate and first and second side members extending away from the face plate, the first and second side members each including an inwardly extending flange for engaging the tabs on the first and second side walls, respectively, to secure the cover to the support.

3. The assembly of claim 1, wherein the cover includes a plurality of insulating strips that extend into the plurality of slots formed in the support to hold the plurality of conductive bus bars in a predetermined position within the support.

4. The assembly of claim 1, wherein the outlet means includes an outlet box located adjacent the cover, the outlet box being formed to include a plurality of apertures, and wherein the outlet means also includes a plurality of clip connectors configured to pass through the plurality of apertures formed in the outlet box and to engage selected conductive bus bars, and means for receiving blade electrodes of a power plug to couple the power plug to the bus bars, thereby supplying electrical power from the conductive bus bars to the power plug.

5. The assembly of claim 1, wherein the cover is a one-piece, electrically insulating cover.

6. The assembly of claim 1, wherein said assembly comprises eight conductive bus bars arranged in a substantially equal spaced apart relation.

7. The assembly of claim 6, wherein the outlet means includes a receptacle positioned away from the bus bars and the cover.

8. The assembly of claim 1, wherein said assembly comprises eight bus bars located in a spaced apart relation, with four of said bus bars being substantially equally spaced to form a first set of bus bars, and the remaining four of said bus bars being substantially equally spaced to form a second set of bus bars, wherein said first set of bus bars is spaced apart from said second set of bus bars.

9. The apparatus of claim 8, wherein said outlet means is disposed between said first and second sets of bus bars.

10. A wiring assembly for mounting on an exposed surface of a wall or wall panel to supply electrical power to the wall or wall panel, the assembly comprising:

a plurality of conductive bus bars extending along the exposed surface of the wall or wall panel;

a one piece electrically insulating support including a base and a plurality of generally parallel insulating dividers extending from the base to define a plurality of elongated slots therebetween, each slot being configured to receive one of the plurality of conductive bus bars therein;

means for coupling the support to said exposed surface;

means for covering the support to shield the plurality of conductive bus bars situated in the plurality of slots;

an electrical outlet; and means for coupling said electrical outlet to selected ones of said bus bars at multiple points along the lengths of the bus bars.

11. The assembly of claim 10, wherein the support includes first and second side walls located on opposite sides of the base and an elongated tab formed on each of the first and second side walls.

12. The assembly of claim 11, wherein the covering means includes a face plate and first and second side members extending away from the face plate, the first and second side members each including a flange for engaging one of the tabs on the first and second side walls to secure the cover to the support.

13. The assembly of claim 10, wherein the means for covering the support comprises a one piece electrically insulating cover coupled to the support, the cover being situated over the plurality of dividers to shield the plurality of conductive bus bars situated in the plurality of slots.

14. The assembly of claim 13, wherein the cover includes a plurality of insulating strips configured to enter the plurality of slots formed in the support to hold the plurality of conductive bus bars in a predetermined position within the support.

15. The assembly of claim 10, wherein the electrical outlet includes an outlet box located adjacent the covering means, the outlet box being formed to include a plurality of apertures, and wherein the means for coupling said electrical outlet to selected ones of said bus bars includes a plurality of clip connectors configured to pass through the plurality of apertures formed in the outlet box and to engage selected conductive bus bars and means for receiving blade electrodes of a power plug to couple the power plug to the conductive bus bars, thereby supplying electrical power from the conductive bus bars to the power plug.

16. The assembly of claim 10, wherein said assembly comprises eight conductive bus bars arranged in a substantially equal spaced apart relation.

17. The assembly of claim 16, wherein the electrical outlet includes a receptacle positioned away from the bus bars and the covering means.

18. The assembly of claim 10, wherein said assembly includes eight bus bars located in a spaced apart relation, with four of said bus bars being substantially equally spaced to form a first set of bus bars, and the remaining four of said bus bars being substantially equally spaced to form a second set of bus bars, wherein said first set of bus bars is spaced apart from said second set of bus bars.

19. The apparatus of claim 18, wherein said electrical outlet is disposed between said first and second sets of bus bars.

20. A modular wiring assembly for mounting on an exposed surface of a wall or wall panel to supply electrical power to the wall or wall panel, the assembly comprising:

a plurality of conductive bus bars extending along the exposed surface of the wall or wall panel;

a plurality of one piece electrically insulating supports, each support including a base and a plurality of generally parallel insulating dividers extending from the base to define a plurality of elongated slots therebetween, each slot being configured to receive one of the plurality of conductive bus bars therein;

means for coupling the plurality of supports to said exposed surface to form a continuous wiring strip on the exposed surface;

a plurality of covers, one cover being coupled to each of the supports to shield the plurality of conductive bus bars situated in the plurality of slots;

a plurality of electrical outlets;

means for coupling said plurality of electrical outlets to selected ones of said bus bars at multiple points along the lengths of the bus bars; and means for electrically coupling conductive bus bars located in adjacent supports together to provide a continuous electrical path through the plurality of supports.

21. The assembly of claim 20, wherein the each support includes first and second side walls located on opposite sides of the base and an elongated tab formed on each of the first and second side walls.

22. The assembly of claim 21, wherein each cover includes a face plate and first and second side members extending away from the face plate, the first and second side members each including a flange for engaging one of the tabs on the first and second side walls to secure the cover to the support.

23. The assembly of claim 20, wherein each cover includes a plurality of insulating strips configured to enter the plurality of slots formed in the support to hold the plurality of conductive bus bars in a predetermined position within the support.

24. The assembly of claim 20, wherein eight bus bars arranged in a substantially equal spaced apart relation are located in each support.

25. The assembly of claim 24, wherein the plurality of electrical outlets each include a receptacle positioned away from the bus bars and the covers.

26. The assembly of claim 20, wherein eight bus bars are arranged in each support in a spaced apart relation, with four of said bus bars being substantially equally spaced to form a first set of bus bars, and the remaining four of said bus bars being substantially equally spaced to form a second set of bus bars, wherein said first set of bus bars is spaced apart from said second set of bus bars.

27. The apparatus of claim 26, wherein said electrical outlet is disposed between said first and second sets of bus bars.

28. The apparatus of claim 20, wherein the means for electrically coupling conductive bus bars located in adjacent supports together includes a jumper located between each adjacent support, each jumper including a plurality of conductive clips for electrically coupling conductive bus bars located in adjacent supports together.

29. A wiring assembly for mounting on an exposed surface of a wall or wall panel to supply electrical power to the wall or wall panel, the assembly comprising:

a plurality of conductive bus bars;

an insulating support including a base and a plurality of generally parallel dividers extending upwardly from the base to define a plurality of slots therebetween, each slot being configured to receive a conductive bus bar therein;

means for coupling the support to said exposed surface;

a cover coupled to the support, the cover being situated over the plurality of dividers to shield the plurality of conductive bus bars situated in the plurality of slots; and outlet means coupled to the conductive bus bars for providing an outlet for electrical power from the wiring assembly;

wherein the support includes first and second side walls located on opposite sides of the base and an elongated tab formed on each of the first and second side walls, and the cover includes a face plate and first and second side members extending away from the face plate, the first and second side members each including an inwardly extending flange for engaging the tabs on the first and second side walls, respectively, to secure the cover to the support.

30. A wiring assembly for mounting on an exposed surface of a wall or wall panel to supply electrical power to the wall or wall panel, the assembly comprising:

a plurality of conductive bus bars;

an insulating support including a base and a plurality of generally parallel dividers extending upwardly from the base to define a plurality of slots therebetween, each slot being configured to receive a conductive bus bar therein;

means for coupling the support to said exposed surface;

a cover coupled to the support, the cover being situated over the plurality of dividers to shield the plurality of conductive bus bars situated in the plurality of slots; and outlet means coupled to the conductive bus bars for providing an outlet for electrical power from the wiring assembly;

wherein said assembly comprises eight conductive bus bars arranged in a substantially equal vertical spaced relation; and further wherein the outlet means includes a receptacle located vertically spaced below the bus bars and the cover.

31. A wiring assembly for mounting on an exposed surface of a wall or wall panel to supply electrical power to the wall or wall panel, the assembly comprising:

a plurality of conductive bus bars;

a one piece electrically insulating support including a base and a plurality of generally parallel insulating dividers extending upwardly from the base to define a plurality of elongated slots therebetween, each slot being configured to receive one of the plurality of conductive bus bars therein;

means for coupling the support to said exposed surface;

means for covering the support to shield the plurality of conductive bus bars situated in the plurality of slots;

an electrical outlet; and means for coupling said electrical outlet to selected ones of said bus bars;

wherein the support includes first and second side walls located on opposite sides of the base and an elongated tab formed on each of the first and second side walls; and further wherein the covering means includes a face plate and first and second side members extending away from the face plate, the first and second side members each including an inwardly extending flange for engaging the tabs on the first and second side walls, respectively, to secure the cover to the support.

32. A wiring assembly for mounting on an exposed surface of a wall or wall panel to supply electrical power to the wall or wall panel, the assembly comprising:

a plurality of conductive bus bars;

a one piece electrically insulating support including a base and a plurality of generally parallel insulating dividers extending upwardly from the base to define a plurality of elongated slots therebetween, each slot being configured to receive one of the plurality of conductive bus bars therein;

means for coupling the support to said exposed surface;

means for covering the support to shield the plurality of conductive bus bars situated in the plurality of slots;

an electrical outlet; and means for coupling said electrical outlet to selected ones of said bus bars;

wherein said assembly comprises eight conductive bus bars arranged in a substantially equal vertical spaced relation; and further wherein the electrical outlet includes a receptacle located vertically spaced below the bus bars and the covering means.

33. A modular wiring assembly for mounting on an exposed surface of a wall or wall panel to supply electrical power to the wall or wall panel, the assembly comprising:

a plurality of conductive bus bars;

a plurality of one piece electrically insulating supports, each support including a base and a plurality of generally parallel insulating dividers extending upwardly from the base to define a plurality of elongated slots therebetween, each slot being configured to receive one of the plurality of conductive bus bars therein;

means for coupling the plurality of supports to said exposed surface to form a continuous wiring strip on the exposed surface;

a plurality of covers, one cover being coupled to each of the supports to shield the plurality of conductive bus bars situated in the plurality of slots;

a plurality of electrical outlets;

means for coupling said plurality of electrical outlets to selected ones of said bus bars; and means for electrically coupling conductive bus bars located in adjacent supports together to provide a continuous electrical path through the plurality of supports;

wherein the each support includes first and second side walls located on opposite sides of the base and an elongated tab formed on each of the first and second side walls; and further wherein each cover includes a face plate and first and second side members extending away from the face plate, the first and second side members each including an inwardly extending flange for engaging the tab on the first and second side walls, respectively, to secure the cover to the support.

34. A modular wiring assembly for mounting on an exposed surface of a wall or wall panel to supply electrical power to the wall or wall panel, the assembly comprising:

a plurality of conductive bus bars;

a plurality of one piece electrically insulating supports, each support including a base and a plurality of generally parallel insulating dividers extending upwardly from the base to define a plurality of elongated slots therebetween, each slot being configured to receive one of the plurality of conductive bus bars therein;

means for coupling the plurality of supports to said exposed surface to form a continuous wiring strip on the exposed surface;

a plurality of covers, one cover being coupled to each of the supports to shield the plurality of conductive bus bars situated in the plurality of slots;

a plurality of electrical outlets;

means for coupling said plurality of electrical outlets to selected ones of said bus bars; and means for electrically coupling conductive bus bars located in adjacent supports together to provide a continuous electrical path through the plurality of supports;

wherein eight bus bars arranged in a substantially equal vertical spaced relation are located in each support; and further wherein the plurality of electrical outlets each include a receptacle located vertically spaced below the bus bars and the covers.

35. A wiring assembly for mounting on an exposed surface of a wall or wall panel to supply electrical power to the wall or wall panel, the assembly comprising:

a plurality of conductive bus bars each having a length substantially equal to that of the other bus bars;

an insulating support including a base and a plurality of generally parallel dividers extending from the base to define a plurality of slots, each slot configured to receive a conductive bus bar and to have a length substantially equal to the lengths of the bus bars;

means having a length substantially equal to the lengths of the bus bars for covering the support to shield the bus bars; and outlet means for coupling to at least two conductive bus bars along the lengths of the bus bars to provide an outlet of electrical power at multiple points along the wiring assembly, the outlet means having a length less than the lengths of the bus bars.

36. The wiring assembly of claim 35, wherein the outlet means includes an outlet box located adjacent the covering means, the outlet box being formed to include a plurality of apertures, and further wherein the outlet means includes a plurality of clip connectors configured to pass through the plurality of apertures formed in the outlet box and engage selected conductive bus bars and means electrically connected to the clip connectors for receiving blade electrodes of a power plug to couple the power plug to the bus bars, thereby supplying electrical power from the conductive bus bars to the power plug.

37. The wiring assembly of claim 36, wherein the outlet box has a length less than the lengths of the bus bars so that a plurality of outlet boxes can be located adjacent the covering means.

* * * * *